(12) United States Patent
Nakamura et al.

(10) Patent No.: US 7,155,897 B2
(45) Date of Patent: Jan. 2, 2007

(54) COMBUSTION TEMPERATURE HIGH SPEED DETECTION DEVICE

(75) Inventors: Shinsuke Nakamura, Takasago (JP); Fuminori Fujii, Takasago (JP); Shinya Uchida, Takasago (JP); Kozo Toyama, Takasago (JP); Hitoi Ono, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 163 days.

(21) Appl. No.: 10/874,312

(22) Filed: Jun. 24, 2004

(65) Prior Publication Data

US 2005/0126183 A1    Jun. 16, 2005

(30) Foreign Application Priority Data

Jul. 18, 2003  (JP)  ............................ 2003-198913

(51) Int. Cl.
  *F02C 7/00*  (2006.01)
  *G01K 1/00*  (2006.01)
(52) U.S. Cl. ...................................... 60/39.24; 374/169
(58) Field of Classification Search ............... 60/39.24; 374/169
  See application file for complete search history.

(56) References Cited

U.S. PATENT DOCUMENTS 3,747,340 A * 7/1973 Fenton et al. ................. 60/223
3,774,395 A * 11/1973 Greune et al. ............. 60/39.25
4,675,804 A * 6/1987 Wiemer ........................ 700/41
4,866,980 A * 9/1989 Falkmann et al. ........... 374/169
5,780,983 A * 7/1998 Shinkawa et al. ........... 318/254
5,834,923 A * 11/1998 Lewin et al. ................ 320/147
6,622,548 B1 * 9/2003 Hernandez .................. 73/118.1

FOREIGN PATENT DOCUMENTS

JP    06-318102    * 11/1994
JP    2001-183238    7/2001

* cited by examiner

Primary Examiner—Ted Kim
(74) Attorney, Agent, or Firm—Westerman, Hattori, Daniels & Adrian, LLP.

(57) ABSTRACT

A combustion temperature high speed detection device is provided with a phase lead processing portion, thereby canceling out a detection lag of a temperature detector, and detecting the combustion gas temperature of a combustor at a high speed. The combustion temperature high speed detection device is also provided with a first-order lag filtering portion with a time constant of 0.25 second, a phase lag processing portion with a time constant of 10 seconds, a temperature change filtering portion with a cutoff frequency of 2 to 3 Hz, and a disturbance filtering portion including first-order lag filtering portions with different time constants and a high value selecting portion. Thus, high speed detection of the combustion gas temperature more suitable for a gas turbine system can be performed.

4 Claims, 4 Drawing Sheets

1 Gas Turbine System
2 Gas Turbine
3 Combustor
4 Compressor
5 Air Intake Portion
6 Fuel Supply Equipment
7 Electric Power Generator
8 Temperature Detector
10 Combustion Temperature High Speed Detection Device
11 Phase Lead-Lag Processing Portion
11A Phase Lead Processing Portion
11B Phase Lag Processing Portion
12 First-Order Lag Filtering Portion
13 Temperature Change Filtering Portion
14 Disturbance Filtering Portion
14A First-Order Lag Filtering Portion
14B First-Order Lag Filtering Portion
14C High Value Selecting Portion
30 Temperature Controller
31 Deviation Computation Portion
32 Proportional and Integral Computation Portion 1 Gas Turbine System
2 Gas Turbine
3 Combustor
4 Compressor
5 Air Intake Portion
6 Fuel Supply Equipment
8 Temperature Detector
8a Protective Material
8b Thermocouple

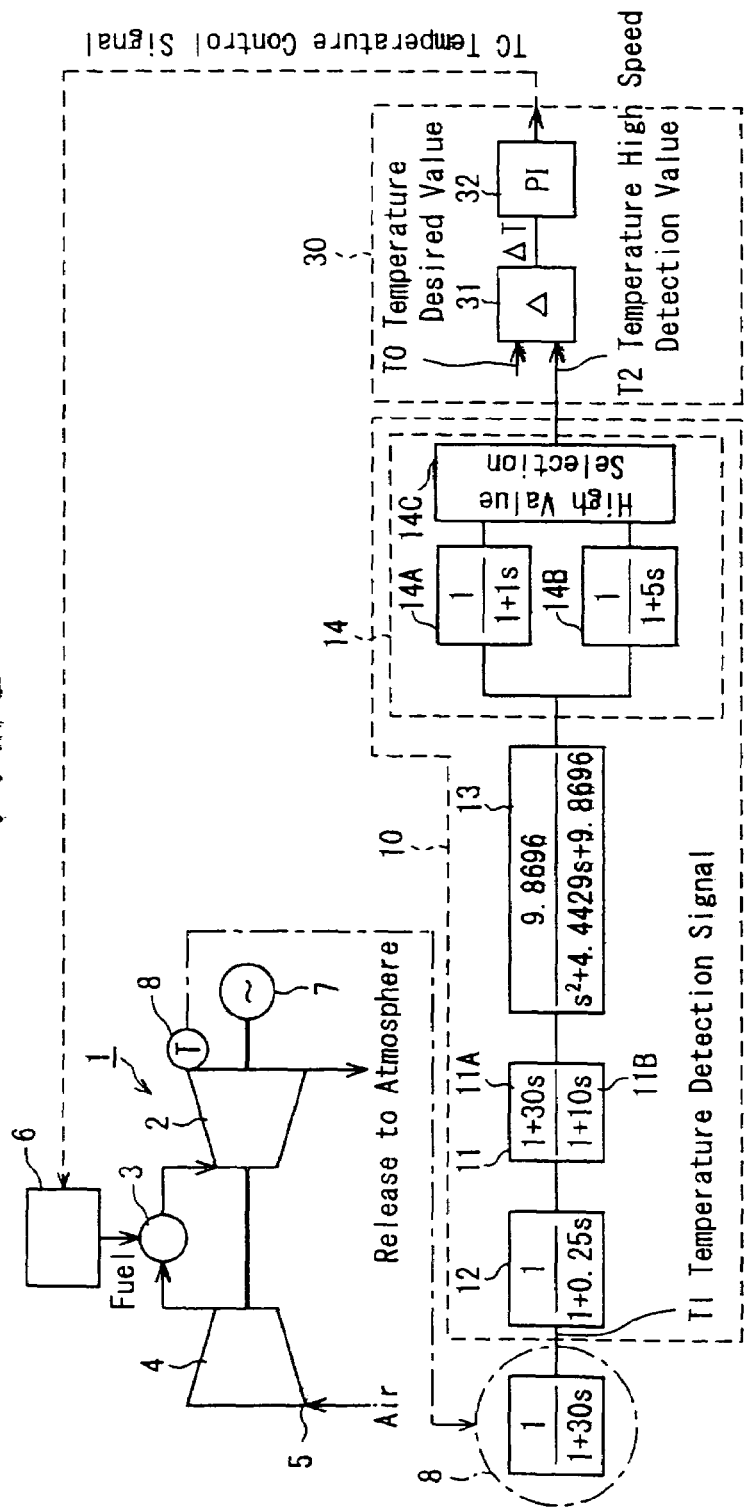

COMBUSTION TEMPERATURE HIGH SPEED DETECTION DEVICE

The entire disclosure of Japanese Patent Application No. 2003-198913 filed on Jul. 18, 2003, including specification, claims, drawings and summary, is incorporated herein by reference in its entirety.

BACKGROUND OF THE INVENTION

1. Field of the Invention

This invention relates to a combustion temperature high speed detection device for detecting, at a high speed, the combustion gas temperature of a combustor, which is provided in a gas turbine system, based on a temperature detection signal from a temperature detector installed in the gas turbine system.

2. Description of the Related Art

A temperature detector using a thermocouple for detecting the combustion gas temperature of a combustor, which is provided in a gas turbine system, is installed in the gas turbine system. A temperature controller of the gas turbine system provides feedback on a temperature detection signal from the temperature detector to exercise control such that the combustion gas temperature of the combustor reaches a predetermined temperature desired value.

An example of temperature detection by a temperature detector using a thermocouple in an electric power plant is an in-piping fluid temperature measuring device as disclosed in Patent Document 1 (Japanese Patent Application Laid-Open No. 2001-183238). In Patent Document 1, a temperature detection element, which is a thermocouple, is connected to steam piping for connecting a steam generator and a steam turbine of a nuclear power plant, although this is not shown herein. The temperature detection element is connected to a temperature detector, an output signal of the temperature detector is entered into a temperature corrector, and an output signal of the temperature corrector is entered into a temperature monitor. The temperature corrector corrects the surface temperature of the piping based on a correlation between a premeasured piping surface temperature and an in-piping temperature, a saturated steam temperature found from a steam pressure, and a correlation between a premeasured steam pressure and the in-piping temperature, thereby determining the fluid temperature inside the piping. According to this procedure, temperature detection can be effected by mounting the temperature detection element on the surface of the piping, without using a thermowell (a protective tube for a thermometer).

With the gas turbine system, a lag in detection of the combustion gas temperature poses a problem. To detect the combustion gas temperature, it is desirable to provide the temperature detector at the outlet of the combustor through which a combustion gas is discharged. However, the temperature is so high at this position that there is no other choice but to place the temperature detector at a downstream side of the gas turbine. This leads to a lag in temperature detection. Furthermore, the combustion gas is high in temperature and high in flow velocity even at the downstream side of the gas turbine. Thus, the thermocouple of the temperature detector is accommodated in a protective material for the purpose of protection. This protective material constitutes a factor for a lag in detection of the combustion gas temperature.

In controlling the combustion gas temperature based on the temperature detection signal, therefore, high speed control responsive to a quick change in the combustion temperature is difficult. If the combustion temperature becomes too high, in particular, the combustor may be damaged. Thus, rapid temperature control is desired in response to a change in the temperature from a lower side to a higher side. In the current situation, high speed control responsive to a rapid temperature rise is difficult because of a lag in temperature detection. To reduce a lag in detection due to the protective material, efforts have been made to minimize the thickness of the protective material. However, the lag in detection has not been fully decreased. Under these circumstances, studies have been conducted on high speed detection of the combustion gas temperature by detection signal processing methods.

SUMMARY OF THE INVENTION

The present invention has been accomplished in view of the above-described circumstances. Its object is to provide a combustion temperature high speed detection device which can detect, at a high speed, a combustion gas temperature by processing a temperature detection signal.

In a first aspect of the present invention for attaining the above object, there is provided a combustion temperature high speed detection device for detecting the combustion gas temperature of a combustor, provided in a gas turbine system, based on a temperature detection signal of a temperature detector installed in the gas turbine system, comprising high speed detection means for predicting the combustion gas temperature by processing the temperature detection signal in accordance with the temperature detection lag characteristics of the temperature detector.

According to this aspect, even if there is a detection lag in the temperature detector, the combustion gas temperature can be detected at a high speed. The use of the so obtained data for temperature control enables high speed temperature control to be achieved.

In a second aspect of the invention, the high speed detection means of the first aspect may be phase lead processing means. According to this aspect, even if there is a detection lag in the temperature detector, the combustion gas temperature can be detected at a high speed. The use of the so obtained data for temperature control enables high speed temperature control to be achieved. By applying the phase lead processing means, moreover, a simple and effective high speed detection means can be achieved.

In a third aspect of the invention, the combustion temperature high speed detection device of the second aspect may further comprise phase lag processing means for relaxing a stepwise change in the temperature detection signal. According to this aspect, a stepwise temperature change, which is impossible in the operation of the gas turbine system is relaxed, thus making it possible to perform high-speed detection of the combustion gas temperature more suitable for the gas turbine system.

In a fourth aspect of the invention, the combustion temperature high speed detection device of the second or third aspect may further comprise first-order lag filtering means for removing a high frequency electrical disturbance, which has slipped into the temperature detection signal, from the temperature detection signal. According to this aspect, a high frequency electrical disturbance (noise component) is removed from the temperature detection signal. This makes it possible to perform high speed detection of the combustion gas temperature more suitable for the gas turbine system.

In a fifth aspect of the invention, the combustion temperature high speed detection device of the second, third or fourth aspect may further comprise temperature change filtering means for filtering out a high frequency component of the temperature detection signal. According to this aspect, a high frequency fluctuating component, which is normally unlikely for the operation of the gas turbine system, is cut out of the temperature detection signal, thus making it possible to perform high speed detection of the combustion gas temperature more suitable for the gas turbine system.

In a sixth aspect of the invention, the combustion temperature high speed detection device of the second, third, fourth or fifth aspect may further comprise disturbance filtering means including: first first-order lag filtering means with a short time constant; second first-order lag filtering means with a long time constant; and high value selecting means for selecting the higher of output values of the first and second first-order lag filtering means. According to this aspect, high speed detection of the combustion gas temperature more suitable for the gas turbine system can be performed. That is, disturbance filtering is abated on the occasion of a temperature change to a higher side, and a change in the temperature detection signal T1 is handled, if possible, as an actual change in the combustion gas temperature (rather than as disturbance) This measure can prevent damage to the combustor due to an excessive rise in the combustion temperature. At the time of a temperature change to a lower side, on the other hand, disturbance filtering is enhanced so as not to judge the combustion gas temperature overly low. This measure can prevent an excessive increase in the amount of fuel supply.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a configuration drawing of a combustion temperature high speed detection device according to an embodiment of the present invention;

DESCRIPTION OF THE PREFERRED EMBODIMENTS

An embodiment of the present invention will now be described in detail with reference to the accompanying drawings, which in no way limit the invention.

Figures 1A, 1B:
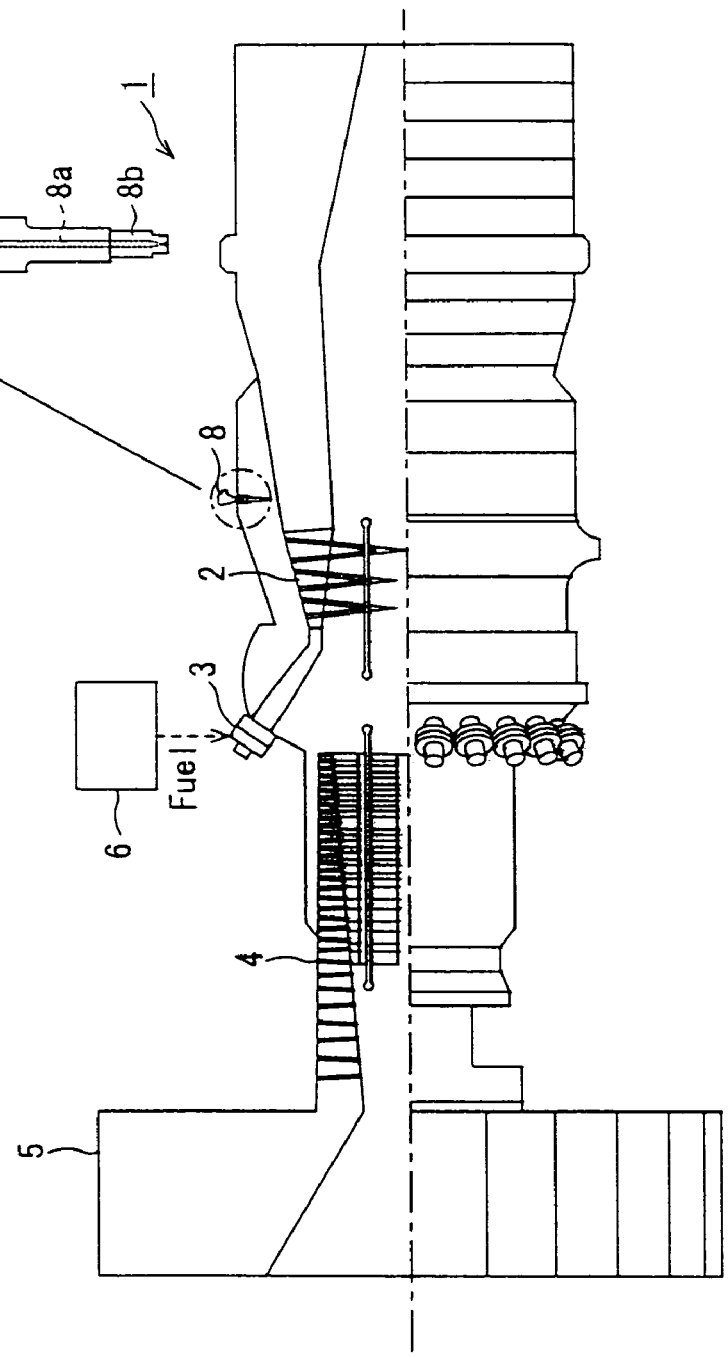
FIG. 1A is a schematic configuration drawing of a gas turbine system.
FIG. 1B is an enlarged view of a temperature detector installed in the gas turbine system.

As shown in the schematic configuration drawing of FIG. 1A and the schematic view of FIG. 2, a gas turbine system 1 has a gas turbine 2, a plurality of combustors 3, and a compressor 4.

The compressor 4 has a rotating shaft coupled to a rotating shaft of the gas turbine 2. The compressor 4 is rotationally driven by the gas turbine 2 to compress air, which has been taken in from an air intake portion 5, and supply it to the combustors 3. In the combustors 3, a fuel supplied from fuel supply equipment 6 is combusted by compressed air supplied from the compressor 4. The resulting combustion gas (combustion energy) rotationally drives the gas turbine 2, which in turn rotationally drives the compressor 4, as mentioned above, and also rotationally drives an electric power generator 7 to generate electricity.

As shown in FIGS. 1A, 1B and 2, the gas turbine system 1 is equipped with a temperature detector 8, a combustion temperature high speed detection device 10, and a temperature controller 30. In FIG. 2, the combustion temperature high speed detection device 10 and the temperature controller 30 are expressed as system diagrams (block diagrams) for signal flow. The symbol s in FIG. 2 is a Laplace operator.

As shown in FIG. 1A, the temperature detector 8 is disposed at a downstream side of the gas turbine 2 (i.e. combustion gas outlet side) for detecting the combustion gas temperature of the combustor 3. To detect the combustion gas temperature, it is desirable to install the temperature detector at the combustion gas outlet of the combustor 3 or at an upstream side of the gas turbine 2 (combustion gas inlet side). At these positions, the combustion gas temperature is so high (for example, 1,300 to 1,500° C.) that the temperature detector cannot be installed there. Hence, the temperature detector 8 is installed at the downstream side of the gas turbine 2, as mentioned above.

As shown in FIG. 1B, the temperature detector 8 may accommodate a thermocouple 8b within a protective material 8a. Even at the downstream side of the gas turbine 2, the combustion gas still has a relatively high temperature (for example, 600 to 800° C.) and a high flow velocity, so that the thermocouple 8b is protected by being accommodated in the protective material 8a. Thus, a lag in detection of the combustion gas temperature occurs in the temperature detector 8 because of the protective material 8a as a cause. As shown in FIG. 2, the temperature detection lag characteristics of the temperature detector 8 can be represented, for example, by a first-order lag with a time constant of 30 seconds (i.e. $1/(1+30s)$).

As shown in FIG. 2, a phase lead-lag processing portion 11 of the combustion temperature high speed detection device 10 has a phase lead processing portion 11A which performs phase lead compensation for $(1+30s)$ as a high speed detection means for predicting the combustion gas temperature by processing a temperature detection signal T1 of the temperature detector 8 in response to the temperature detection lag characteristics of the temperature detector 8. In the phase lead processing portion 11A, a gain of 30 of a differential (s) is set in correspondence with the first-order lag time constant of 30 seconds of the temperature detector 8.

Thus, the temperature detection signal T1 of the temperature detector 8 is subjected to phase lead processing $(1+30s)$ by the phase lead processing portion 11A. As a result, $(1+30s)$ in the first-order lag of the temperature detection signal T1 is cancelled out to obtain (predict) the combustion gas temperature of the combustor 3. That is, the combustion gas temperature is detected at a high speed. In short, the phase lead processing portion 11a performs differentiation processing to find a temperature change in the temperature detection signal T1, and multiplies this temperature change by the gain of 30, thereby making it possible to predict how far the combustion gas temperature will rise.

It goes without saying that if the first-order lag time constant of the temperature detector 8 becomes shorter than 30 seconds (for example, if it becomes 15 seconds or 20 seconds), the gain of differential (s) of the phase lead processing portion 11A may also be adjusted in accordance with this first-order lag time constant (for example, may be adjusted to 15 or 20).

Furthermore, the combustion temperature high speed detection device 10 includes various filtering portions 11B, 12, 13 and 14, in addition to the phase lead processing portion 11A, designed to make the combustion temperature high speed detection device 10 more suitable for the gas turbine system 1.

Figure 3A:
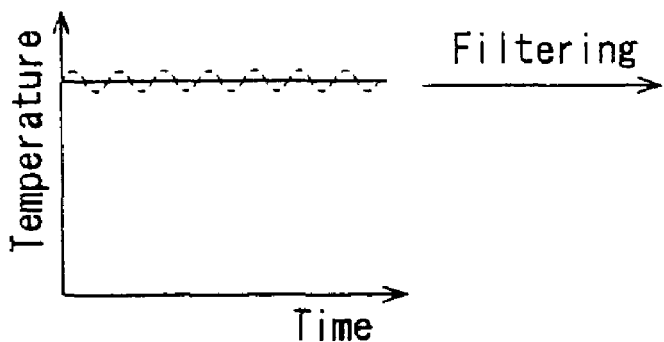
FIGS. 3A and 3B are explanation drawings showing the function of a first-order lag filtering portion provided in the combustion temperature high speed detection device.

The first-order lag filtering portion 12 is provided as a first-order lag filtering means for removing a high frequency electrical disturbance (noise component), which has slipped into the temperature detection signal T1 of the temperature detector 8, from the temperature detection signal T1. When a high output motor is acting, for example, a high frequency electrical disturbance (dotted lines in FIG. 3A) may steadily enter the temperature detection signal (electrical signal) T1 (a solid line in FIGS. 3A and 3B) of the temperature detector 8 under the influence of the action of the high output motor.

Figure 3B:
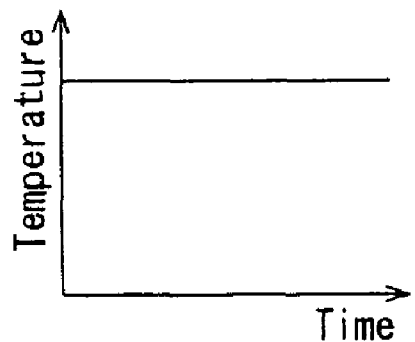

Thus, the first-order lag filtering portion 12 for (1/(1+0.25 s)) is provided. In the first-order lag filtering portion 12, a time constant (0.25 second in the illustrated example) suitable for removing electrical disturbance is set. As illustrated in FIG. 3B, a high frequency electrical disturbance (a pulse of 200 us, 50° C.) incorporated in the temperature detection signal T1 can be removed from the temperature detection signal T1. Of course, the first-order lag time constant may be appropriately adjusted in accordance with the characteristics of the electrical disturbance.

Figure 4:
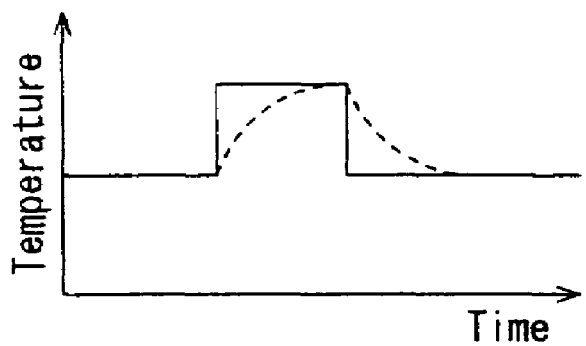
FIG. 4 is an explanation drawing showing the function of a phase lag processing portion provided in the combustion temperature high speed detection device.

The phase lead-lag processing portion 11 has the phase lag processing portion 11B. The phase lag processing portion 11B is adapted to perform phase lag compensation for (1/(1+10 s)), and is provided as a phase lag processing means for relaxing a stepwise change in the temperature detection signal T1 of the temperature detector 8. The phase lead processing portion 11A produces an excessive response (overshoot) in response to a stepwise abrupt change (abrupt increase or abrupt decrease) in the temperature detection signal T1 as indicated by solid lines in FIG. 4. Such a stepwise abrupt change is impossible in the operation of the gas turbine system 1. That is, if only the phase lead processing portion 11A is provided, an excessive response may be caused in the operation of the gas turbine system 1 to make temperature control unstable.

Thus, temperature control is stabilized by providing the phase lag processing portion 11B, although this is contrary to the purpose of high speed detection. In the phase lag processing portion 11B, which deals with the first-order lag, its time constant is set at a value (10 seconds in the illustrated example) which is less than the first-order lag time constant of the temperature controller 8. As illustrated by a dotted line in FIG. 4, the phase lag processing portion 11B can relax the stepwise change in the temperature detection signal T1 to stabilize temperature control. The first-order lag time constant of the phase lag processing portion 11B is on the order of 10 seconds. Even if phase lag processing of such a degree is performed, about 3-fold high speed detection can be made in comparison with the first-order lag time constant of 30 seconds in the temperature detector 8. Thus, desired high speed temperature control is not affected.

Figure 5:
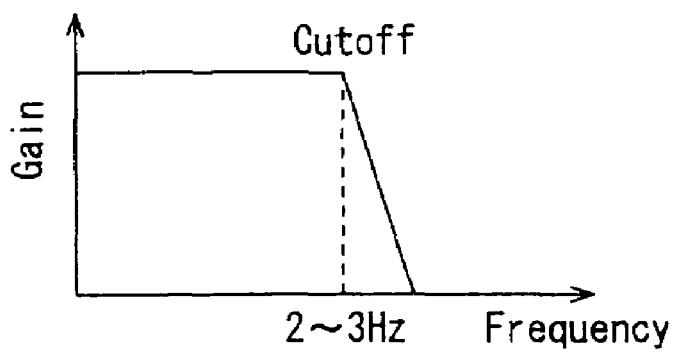
FIG. 5 is an explanation drawing showing the function of a temperature change filtering portion provided in the combustion temperature high speed detection device.

The temperature change filtering portion 13 is provided as a temperature change filtering means for filtering out a high frequency component of the temperature detection signal T1 of the temperature detector 8. That is, it is normally inconceivable in the operation of the gas turbine system 1 that the combustion gas temperature of the combustor 3 fluctuates at a high frequency of 2 to 3 Hz or more. Thus, the temperature change filtering portion 13 is provided as a high frequency cutting filter (low pass filter) for filtering out a high frequency component of 2 to 3 Hz or higher. That is, the temperature change filtering portion 13 deals with a second-order lag, and various constants of the second-order lag are set as in FIG. 2, whereby a cutoff frequency is set at 2 to 3 Hz as shown in FIG. 5. It goes without saying that the cutoff frequency is not limited to 2 to 3 Hz, but may be adjusted to other frequency by adjusting the aforementioned constants.

The disturbance filtering portion 14 is provided as a disturbance filtering means for separating actual changes in the combustion gas temperature from disturbance (filtering of disturbance), and for optimizing disturbance filtering in response to changes (increases and decreases) in the combustion gas temperature.

In detail, the disturbance filtering portion 14 includes a first-order lag filtering portion 14A as a 1st first-order lag filtering means having a relatively short time constant (1 second in the illustrated example) a first-order lag filtering portion 14B as a 2nd first-order lag filtering means having a relatively long time constant (5 seconds in the illustrated example), and a high value selecting portion 14c as a high value selecting means for selecting the higher of the output values of these first-order lag filtering portions 14A and 14B.

Figure 6A:
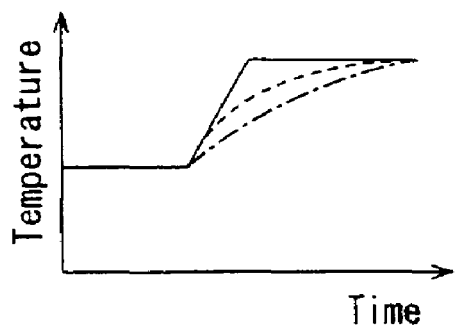
FIGS. 6A to 6C are explanation drawings showing the functions of a disturbance filtering portion provided in the combustion temperature high speed detection device.
Figure 6B:
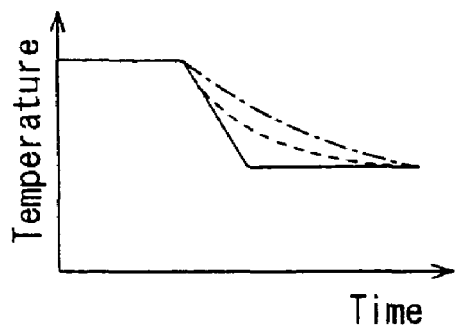

For example, when the temperature detection signal T1 increases as indicated by solid lines in FIG. 6A, the output value of the first-order lag filtering portion 14A indicated by a dashed line in the drawing becomes higher than the output value of the first-order lag filtering portion 14B indicated by a dashed dotted line in the drawing. Thus, the high value selecting portion 14C selects and outputs the former output value. When the temperature detection signal T1 decreases as indicated by solid lines in FIG. 6B, on the other hand, the output value of the first-order lag filtering portion 14B indicated by a dashed dotted line in the drawing becomes higher than the output value of the first-order lag filtering portion 14A indicated by a dashed line in the drawing. Thus, the high value selecting portion 14C selects and outputs the former output value.

Figure 6C:
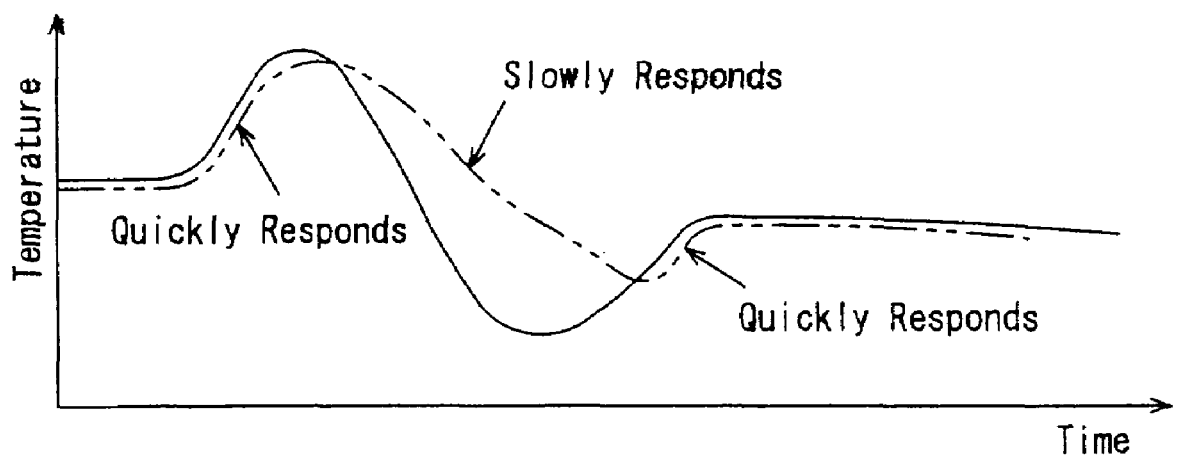

When the combustion gas temperature (temperature detection signal T1) changes as indicated by a solid line in FIG. 6C, for example, the output of the disturbance filtering portion 14, as shown by a dashed double-dotted line in the drawing, quickly responds (follows) and increases if the temperature detection signal T1 increases, and slowly responds (follows) and decreases if the temperature detection signal T1 decreases.

That is, a change in the combustion gas temperature to a higher side is more critical to the gas turbine system 1 than its change to a lower side. This is because if the combustion temperature becomes too high, the combustor 3 may be damaged, so that prompt temperature control is desired, particularly, in the case of a temperature change to a higher side. Hence, the higher of the output values of the first-order lag filtering portions 14A and 14B with different time constants is selected by the high value selecting portion 14C, whereby disturbance filtering is abated on the occasion of a temperature change to a higher side, and a change in the temperature detection signal T1 is handled, if possible, as an actual change in the combustion gas temperature (rather than as disturbance). At the time of a temperature change to a lower side, on the other hand, disturbance filtering is enhanced so as not to judge the combustion gas temperature overly low. This measure can prevent an excessive increase in the amount of fuel supply.

A temperature high speed detection value T2 obtained by the combustion temperature high speed detection device 10 is outputted (given as feedback) to the temperature controller 30. The temperature controller 30 has a deviation computation portion 31 determine a temperature deviation ΔT between the temperature high speed detection value T2 and a temperature desired value T0 (i.e. ΔT=T0−T2), and has a proportional and integral computation portion 32 perform proportional and integral computation of the temperature deviation ΔT to obtain a temperature control signal TC, followed by outputting it to the fuel supply equipment 6. If the temperature high speed detection value T2 is lower than the temperature desired value T0, the temperature control signal TC becomes an increase request signal for the amount of fuel supply. If the temperature high speed detection value T2 is higher than the temperature desired value T0, the temperature control signal TC becomes a decrease request signal for the amount of fuel supply. The fuel supply equipment 6 controls the amount of fuel supply to the combustor 3 based on the temperature control signal TC.

Thus, the fuel gas temperature (temperature detection values T1, T2) of the combustor 3 is controlled so as to become the temperature desired value T0. Moreover, temperature control at this time is exercised based on the temperature high speed detection value T2, the value detected at a high speed by the combustion temperature high speed detection device 10 having the phase lead processing portion 11A. Thus, this temperature control has a higher speed than conventional ones.

Furthermore, the combustion temperature high speed detection device 10 has not only the phase lead processing portion 11A, but also the phase lag processing portion 11B, the first-order lag filtering portion 12, the temperature change filtering portion 13, and the disturbance filtering portion 14 (first-order lag filtering portions 14A, 14B, high value selecting portion 14C). Thus, the temperature high speed detection value T2 determined by the combustion temperature high speed detection device 10 is a temperature detection value more suitable for the combustion gas temperature control of the gas turbine system 1.

The respective processing portions 11, 12, 13 and 14 of the combustion temperature high speed detection device 10, and the respective computation portions 31 and 32 of the temperature controller 30 are composed of software, and their processings are performed by a microcomputer. Of course, the sequence of the respective processing portions in the combustion temperature high speed detection device 10 may be changed arbitrarily. Even in this case, their functions are unchanged. For example, the phase lead-lag processing portion 11 and the disturbance filtering portion 14 may be interchanged.

In the foregoing embodiment, high speed detection of the combustion gas temperature is achieved by phase lead (phase lead processing portion 11A), which is a simple and effective signal processing method. However, this method is not necessarily restrictive, and there may be used a high speed detection means which processes the temperature detection signal T1 in accordance with the temperature detection lag characteristics of the temperature detector 8, thereby predicting the combustion gas temperature. For example, it is permissible to prepare, beforehand, a temperature map representing the correlation between the temperature detection signal T1 and the actual combustion gas temperature, and predict the combustion gas temperature based on this temperature map and the temperature detection signal T1, thereby achieving high speed detection.

While the present invention has been described by the above embodiment, it is to be understood that the invention is not limited thereby, but may be varied or modified in many other ways. Such variations or modifications are not to be regarded as a departure from the spirit and scope of the invention, and all such variations and modifications as would be obvious to one skilled in the art are intended to be included within the scope of the appended claims.

What is claimed is:

1. A combustion temperature high speed detection device for detecting a combustion gas temperature of a combustor, provided in a gas turbine system, based on a temperature detection signal of a temperature detector installed in said gas turbine system, comprising:

high speed detection means for predicting said combustion gas temperature by processing said temperature detection signal in accordance with temperature detection lag characteristics of said temperature detector; and disturbance filtering means including:

first first-order lag filtering means with a short time constant;

second first-order lag filtering means with a long time constant; and high value selecting means for selecting the higher of output values of said first and second first-order lag filtering means;

wherein said high speed detection means is phase lead processing means.

2. The combustion temperature high speed detection device according to claim 1, further comprising phase lag processing means for relaxing a stepwise change in said temperature detection signal.

3. The combustion temperature high speed detection device according to claim 1, further comprising first-order lag filtering means for removing a high frequency electrical disturbance, which has slipped into said temperature detection signal, from said temperature detection signal.

4. The combustion temperature high speed detection device according to claim 1, further comprising temperature change filtering means for filtering out a high frequency component of said temperature detection signal.

* * * * *